United States Patent
Bestler et al.

(10) Patent No.: US 8,849,759 B2
(45) Date of Patent: Sep. 30, 2014

(54) UNIFIED LOCAL STORAGE SUPPORTING FILE AND CLOUD OBJECT ACCESS

(75) Inventors: Caitlin Bestler, Sunnyvale, CA (US); Alexander Aizman, Mountain View, CA (US)

(73) Assignee: Nexenta Systems, Inc., Santa Clara, CA (US)

( * ) Notice: Subject to any disclaimer, the term of this patent is extended or adjusted under 35 U.S.C. 154(b) by 11 days.

(21) Appl. No.: 13/415,742

(22) Filed: Mar. 8, 2012

(65) Prior Publication Data

US 2013/0185258 A1    Jul. 18, 2013

Related U.S. Application Data

(60) Provisional application No. 61/586,678, filed on Jan. 13, 2012.

(51) Int. Cl.
G06F 17/30    (2006.01)

(52) U.S. Cl.
USPC .......................................... 707/638; 707/695

(58) Field of Classification Search
USPC .......................................... 707/638, 708, 789
See application file for complete search history.

(56) References Cited

U.S. PATENT DOCUMENTS

| | | | |
|---|---|---|---|
| 7,266,645 | B2 | 9/2007 | Garg et al. |
| 7,480,782 | B2 | 1/2009 | Garthwaite |
| 7,840,618 | B2 | 11/2010 | Zhang et al. |
| 8,185,715 | B1 | 5/2012 | Chow et al. |
| 8,229,899 | B2 | 7/2012 | Anderson et al. |
| 8,392,370 | B1 | 3/2013 | Whitney et al. |
| 2008/0005175 | A1 | 1/2008 | Bourke et al. |
| 2010/0042790 | A1 | 2/2010 | Mondal et al. |
| 2010/0191783 | A1 | 7/2010 | Mason et al. |
| 2010/0199042 | A1 | 8/2010 | Bates et al. |
| 2010/0211781 | A1 | 8/2010 | Auradkar et al. |
| 2010/0268902 | A1 | 10/2010 | Drobychev et al. |
| 2010/0332401 | A1 | 12/2010 | Prahlad et al. |
| 2011/0022566 | A1 | 1/2011 | Beaverson et al. |
| 2011/0040732 | A1 | 2/2011 | Anglin et al. |
| 2011/0072059 | A1* | 3/2011 | Guarraci ....................... 707/823 |
| 2011/0099200 | A1 | 4/2011 | Blount et al. |
| 2011/0153570 | A1 | 6/2011 | Kim |
| 2011/0153606 | A1 | 6/2011 | Kim et al. |
| 2011/0196822 | A1 | 8/2011 | Zunger et al. |
| 2011/0196900 | A1* | 8/2011 | Drobychev et al. ........... 707/812 |

(Continued)

OTHER PUBLICATIONS

The Extended European Search Report issued Sep. 20, 2013 for European Application No. 13150988.7.

(Continued)

*Primary Examiner* — Alicia Lewis
*Assistant Examiner* — Hau H Hoang
(74) *Attorney, Agent, or Firm* — Nixon Peabody LLP

(57) ABSTRACT

A method and system for providing unified local storage support for file and cloud access is disclosed. The method comprises writing a chunk on a storage server, and replicating the chunk to other selected storage servers when necessary. The method and system further comprise writing a version manifest on the storage server; replicating the version manifest to other selected storage servers when necessary. Object puts or appends are implemented by first chunking the object, determining if the chunks are new, transferring the chunks if required, followed by creation of a new version manifest referencing the chunks. Finally, the method and system include providing concurrent file-oriented read and write access consistent with the stored version manifests and chunks.

2 Claims, 9 Drawing Sheets

(56) References Cited

U.S. PATENT DOCUMENTS

| | | |
|---|---|---|
| 2011/0252071 A1 | 10/2011 | Cidon |
| 2012/0310982 A1 | 12/2012 | Jennery et al. |
| 2012/0330894 A1* | 12/2012 | Slik .............................. 707/626 |

OTHER PUBLICATIONS

"Protect Your Data from RAID," Caringo, Inc., White Paper, Jul. 2011, pp. 1-18.

Derek Gascon, "Content Storage for a New Millennium," Caringo, Inc., White Paper, Mar. 2008, pp. 1-9.

"CAStor Application Guide," Version 3.0.2, Caringo, Inc., Jul. 2009, pp. 1-34.

Sage A. Weil, et al., "Ceph: A Scalable, High-Performance Distributed File System," Mar. 2006, Santa Cruz, 14 pages.

Konstantin Shvachko, et al., "The Hadoop Distributed File System," Mass Storage Systems and Technologies (MSST), 2010 IEEE 26th Symposium on, May 3-7, 2010, Sunnyvale, California USA, pp. 1-10.

Sanjay Ghemawat, et al., "The Google File System," SOSP—03 Proceedings of the nineteenth ACM symposium on Operating systems principles, Dec. 2003, pp. 29-43.

The Extended European Search Report issued Dec. 10, 2012 for European Application No. 12179570.2.

Weimin Zheng, et al., "Design a cloud storage platform for pervasive computing environments," Cluster Computing, Kluwer Academic Publishers, Bo, vol. 13, No. 2, Nov. 15, 2009, pp. 141-151.

* cited by examiner

200

UNIFIED LOCAL STORAGE SUPPORTING FILE AND CLOUD OBJECT ACCESS

CROSS-REFERENCE TO RELATED APPLICATIONS

Under 35 USC 119(e), this application claims priority to U.S. Provisional Application No. 61/586,678, filed on Jan. 13, 2012, and is related to co-pending U.S. patent application Ser. No. 13/209,342, entitled "Cloud Storage Systems with Distributed Metadata," filed on Aug. 12, 2011, which is incorporated herein by reference.

FIELD OF THE INVENTION

The present invention generally relates to storage systems which support both file-oriented access and object-oriented access to the same set of objects.

BACKGROUND OF THE INVENTION

Storage appliances may be configured to concurrently provide multiple storage services. For example, a storage appliance may internally provide access to objects using a file-oriented application programming interface (API) to support network attached-storage (NAS) protocols such as a network file system (NFS) and common internet file system (CIFS) as well as an Object Get/Put API (to support Cloud Storage protocols such as Amazon S3, OpenStack Swift or Hadoop Distributed File System).

Conventional solutions allow these services to co-exist, but with little or no consolidation of the underlying storage resources. File and object services will typically both map to the local file system, but they will also map to separate portions of it. Many conventional object services use databases to store account and/or container information about objects, rather than files directly. However, since the databases are implemented using files the object service is still using the local file system.

In conventional solutions, when the same document is stored using both file and object services, the same content will typically be recorded twice. The same set of account and container related information will be encoded first for file access and will be encoded a second time for object access. Policies about which set of users are allowed to access which set of documents will typically have to be expressed in both file and object terms.

The conventional solution to having a single storage appliance provide file and object services is to simply enable both services, but to access different storage resources for each, and then to enable access independently (and redundantly). File services would export portions of the local file system with access control lists (ACLs) encoded directly in the file system, while object services would encode objects in non-exported portions of the local file system and typically encode ACLs either in the local file system and/or a database. Conventional operating systems provide file-oriented access to persistent data. Various libraries in user and/or kernel spaces provide cloud-oriented get/put access to persistent objects.

Conventional solutions are also poorly structured to provide for deduplication of objects. Block layer compression and deduplication features are conventionally limited to a single storage server because the block layer is unaware of payload stored by other storage servers. Further, in conventional solutions indexing to detect duplication is an additional burden placed on each storage server that may consume extra resources. These resources may have been better utilized for other storage related functions such as additional caching.

Objects are made accessible to file-oriented clients as conventional files, typically in full or nearly complete compliance with the portable operating system interface (POSIX) standards for file access. This enables access by an installed software base that includes NAS clients but not cloud storage clients, and when applications require NAS semantics for a truly shared update of an object. Cloud storage clients can be used to access those same objects under cloud storage protocol semantics for the majority of applications that do not truly require concurrent file sharing semantics.

Conventional solutions have positioned cloud objects as second class entities. The cloud objects are ultimately encoded as conventional files on specific object servers after the cloud layer determines which server should hold each object. Traditional file systems were designed before the cloud access paradigm. Even when the local file system is capable of storing metadata for cloud objects the system is not optimized for cloud access patterns.

Many cloud storage systems organize storage of the payload of objects as chunks. This enables parallel transfer of payload and allows the payload of a single large object to be spread over multiple storage servers. Cloud storage APIs have been designed with more concern for supporting versioning of files. With many cloud storage APIs, a client can request the current version of an object and be directed to access chunks which are stored on multiple storage servers. Without a separation of metadata and chunk storage, all versions of any object would need to be stored on the same set of storage servers or older versions would have to be migrated from their initial location after they were no longer the current version.

Chunk servers are storage servers which store chunks. The chunks are referenced in metadata for objects managed by other storage servers known variously as metadata servers and namenodes. Chunk servers are a common element in existing pNFS and cloud storage systems. A distributed metadata system and/or a metadata server describe an object to a client as one or more chunks. The client then obtains the portions of the objects by getting the chunks from chunk servers. The specific chunk server (or servers) may be specified by a hashing algorithm or explicitly by the metadata server. In conventional implementations, each chunk server typically stores the chunks assigned to it as files within a local file system, such as EXT4 or XFS.

Conventionally, computer systems organize persistent storage resources either as file systems or as volumes. Neither of these solutions is well suited for the storage and retrieval of chunks. The encoding used for file systems allow for a large number of options that are simply irrelevant for stored chunks. These include:

The mapping of a file to a specific set of blocks is designed to accommodate changes in the total size of a file.

Mappings are not optimized for a specific size because the size of a file can be changed by any operation.

A mapping that was optimized for a total file size less than a predetermined size, for example, less than 1 MB would have to be totally re-written as soon as the file exceeded 1 MB in size.

Chunks have a fixed size that is set when they are first created.

A chunk may be deleted, but it is never expanded or contracted.

Additionally, the need to provide transactional integrity forces conventional file system designs to support at least a limited form of versioning where the blocks referenced by an existing file handle opened for read must be preserved until the file handle is closed even after the blocks have been replaced as the current content of the file. Furthermore, files are conventionally identified with file names which are composed of printable characters and organized in hierarchical directories.

Conventional volumes support random writes. Many conventional designs also allow for thin provisioning. Both of these features require the data layout of a volume to support rewritable data and dynamic changes to the set of blocks that comprise the volume. By contrast, chunks do not dynamically change size and are never rewritten after creation.

Further, conventional storage systems support a small number of volumes. Systems may have expanded towards supporting hundreds or thousands of volumes, but using a volume to encode chunks would not be optimal when the number of chunks will typically be measured in millions or billions.

Storage servers are frequently federated so that a group of storage servers collaborate to provide a unified namespace for a set of objects. This is typically the case for file-oriented storage servers, and nearly always the case for cloud storage servers. Once multiple storage servers are federated, two issues must be addressed: how is new information replicated through the set of storage servers, and how can a client accessing this data know that it is receiving the most recent information.

Conventional solutions allow for persistent files supporting an object to be updated at different times on different storage servers. This necessitates complex logic to ensure that the most current information is effective. Existing solutions that rely on metadata servers, such as Hadoop Distributed File System and pNFS, require the metadata server to track the status of distributed images, co-ordinate updates of the images and to only steer clients to copies that are current. Requiring centralized metadata limits the scalability of the storage system.

Solutions such as OpenStack object storage (codenamed Swift) avoid creating a central metadata server by requiring all access to be performed by a set of proxy servers. The set of proxy servers are relied upon to implement uniform update strategies where each transaction is completed only after a majority of the active physical copies of any object have been successfully updated. This will have a severe performance impact if the storage servers are not located within a single site, and precludes retaining of extra copies for opportunistic caching.

What is needed is a system and method that addresses the above-identified issues. The present invention meets such a need.

SUMMARY OF THE INVENTION

A method and system for providing unified local storage support for file and cloud access is disclosed. The method comprises writing a chunk on a storage server; and replicating the chunk to other selected storage servers when necessary. The method and system further comprise writing a version manifest on the storage server; replicating the version manifest to other selected storage servers when necessary. The chunks and version manifests interact to provide the proper version of the object. Finally, the method and system include providing concurrent file oriented read and write access consistent with the stored version manifests and chunks.

DEFINITIONS

Figure 1:
FIG. 1 is a block diagram of a data storage system in accordance with an embodiment.

Append Point: The logical offset for a version of on object at which all subsequent chunk references were explicitly specified in the transactional manifest.

Blob: a Version Manifest and/or Chunk Image as stored by a single storage server.

Chunk: A sequence of bytes found in one or more objects. If optionally compressed it also has the metadata attributes of the compression algorithm used and the resulting compressed length.

Chunk Image: a persistent image of a chunk maintained by a specific storage server that encodes the chunk payload and immutable metadata of the chunk.

Chunk Identifier: A unique identifier of a chunk formed by applying a cryptographic hash algorithm to take the fingerprint of the compressed payload of the chunk.

Chunk Reference: A reference to a chunk identifier within a version manifest.

Class of Storage: An enumerator that specifies a policy on the types of resources that are required to guarantee persistent storage for an object, or the chunks referenced by the object.

Consistent Hashing: a class of hashing algorithm where changes in the set of available servers has a minimal impact on the assignment of objects to servers.

Mapped Service: A conceptual enclosure that provides context for a set of objects that are referenced as part of one cloud and/or file-oriented service.

Pending Manifest: A version manifest in the pending state. Pending manifests are created to support file-oriented write access.

Preimage attack: An attack on a hash algorithm where the payload to produce a desired n-bit hash value can be obtained in considerably less than a brute force serial search of all possible payload values.

Service Mapping: an interface specific entry that references a mapped service.

Shared File Access Epoch: The period during which one or more client use the file-oriented API to have write access to an object before synchronizing the updates to be visible through the object API.

Transactional Manifest: An encoding of the set of metadata and chunk reference changes that a transaction will make to an object.

Unique Version Identifier: Unique version identifier for a version manifest as specified in an embodiment.

Version Manifest: An encoding of the metadata and chunk references for an object as of a specific version.

DETAILED DESCRIPTION OF THE INVENTION

The present invention generally relates to storage systems which support both classical file-oriented access and object-oriented access to the same set of objects. The following description is presented to enable one of ordinary skill in the art to make and use the invention and is provided in the context of a patent application and its requirements. Various modifications to the embodiments and the generic principles and features described herein will be readily apparent to those skilled in the art. Thus, the present invention is not intended to be limited to the embodiments shown, but is to be accorded the widest scope consistent with the principles and features described herein.

FIG. 1 is a block diagram of a data storage system 10 in accordance with an embodiment. The data storage system 10 includes one or more servers 16a, 16b and 16c, where each of these servers 16a-16c can be accessed by a local client 18 or a file oriented access 20. A plurality of version manifests 23 are stored in a solid state drive (SSD) 12. The chunks or payloads 25 are stored in a hard disk drive (HDD) or solid state drive (SSD) 14.

Providing truly first class access for both object and file clients calls for a single object storage system that supports both object and file clients in a single local persistent storage system. The same local persistent storage holds objects that can be accessed as files using hierarchical directories and conventional file operations (open/close/read/write/make directory/ . . . ) from file users, and using a flat directory with conventional cloud object operations (get/put) for cloud users.

The present invention provides persistent storage for a set of objects which are accessible using both file-oriented and cloud object storage operations. This unified storage service may coexist with conventional stand-alone cloud object storage or conventional file services.

A method and system for providing unified local storage support for file and cloud access is disclosed. The method comprises writing a chunk on a storage server; and replicating the chunk to other selected storage servers when necessary. The method and system further comprise writing a version manifest on the storage server; replicating the version manifest to other selected storage servers when necessary. The chunks and version manifests interact to provide the proper version of the object. Finally, the method and system include providing concurrent file oriented read and write access consistent with the stored version manifests and chunks.

In an embodiment, file-oriented access is provided through a virtual file system (VFS) module that implements a polymorphic set of file-oriented methods for a specific file system format. VFS modules are a conventional feature of most UNIX related operating systems. VFS modules enable support of multiple concurrent file systems, such as EXT3, EXT4 and XFS.

Any method of providing a file oriented API to client software, including daemons implementing NAS protocols such as NFS and CIFS, is compatible with the present invention. Similarly, any embodiment may also designate an object API to clients that prefer to get or put objects, such as daemons implementing cloud storage protocols like Amazon S3 or OpenStack Swift.

Methods and system are disclosed for allowing a storage server to provide both traditional file-oriented and cloud-oriented object get/put access to a set of objects. The methods and systems disclosed are compatible with providing persistent storage via files in local file systems or records within a database. A different time scale for concurrent access to objects between file-oriented protocols based upon open/read/write/close operations and object protocols based upon get/put/append operations is reconciled without requiring a central server.

The resulting service provides for eventual consistency across federated storage servers even when the network connecting the federated storage servers has been partitioned. A unified file and object storage system in accordance with an embodiment supports access by file and object modules to objects in a manner that only required each object to be stored once.

Chunk Images

To provide a persistent payload, the information within the storage server is handled as chunks of data in a manner such that each chunk is written only once on a given storage server. To describe this feature, refer to the following description in conjunction with the accompanying Figures. The payload for each object version is stored as zero or more chunks in chunk images. A chunk is a sequence of one or more bytes where the bytes do not change once created. Each chunk is identified by a cryptographic fingerprint of the bytes. In an embodiment, the algorithm used is SHA-256. Different embodiments can select other algorithms, but each selected algorithm should be of sufficient strength that they are not reasonably vulnerable to a pre-image attack. A pre-image attack is an attack that can find an alternative chunk payload that will have the same fingerprint as an existing chunk by a means that is considerably less than the effort of a brute-force search of all possible payloads.

The chunk image is an abstraction for aggregating raw persistent storage resources and persistently stored metadata about the chunk. A new dataset type is used for chunk images. The dataset has the following characteristics:

A) Chunks are identified by a chunk identifier in a flat name space.

B) Each chunk image has the following metadata attributes which must be supplied when the chunk image is created:

The logical length of the payload.

The compression algorithm used to compress the payload.
  The set of algorithms supported must include "none".

The compressed length of the payload.

On each specific storage server, the set of blocks on various physical devices allocated to store the payload for this chunk, or when replicating the chunk image the sequence of payload bytes.

Datasets are already an abstraction that is used for volume services and file services. A dataset can combine portions of multiple raw devices and apply well-known algorithms such as RAID, mirroring and striping.

A set of storage servers may be federated to provide fault tolerant service by dividing the responsibility for storing chunk images. The federated set of storage servers share algorithms to:

A) Determine which servers are responsible for retaining copies of each chunk image. As will be explained, because of the manner in which chunk images are created any storage server may choose to retain a copy of a chunk image even when it is not responsible for doing so.

B) Replicate chunk images and/or metadata about chunk images between the chunk servers.

A conventional method of storing chunks would be to encode each as a file within the local file system with a file name derived from the cryptographic fingerprint. The new type of dataset is defined, herein, which combines aspects of a logical volume service with aspects of a file system service. A given dataset may therefore be used as a file system, or as a logical volume.

Datasets are an existing abstraction for storage services in the ZFS filesystem, which is used in the preferred embodiment. ZFS is a 128-bit file system developed originally by Sun Microsystems, and currently supported by Solaris 11, OpenSolaris, Illumos and FreeBSD Operating Systems.

In other embodiments, the exact set of common capabilities would be added on top of a logical volume or similar abstractions. For example, ZFS datasets provide transactional integrity on updates, while logical volumes for other operating systems may require the layer above the logical volumes to carefully sequence write operations to achieve transactional integrity. Another example is support for key/value metadata and snapshotting are standard capabilities for ZFS datasets. By contrast, that same capability would have to be added above the logical volume capabilities found in other operating systems.

A chunk image dataset differs from a file system dataset in the following ways:

A) A file system typically supports a far richer set of metadata fields, including arbitrary key/value name pairs. The metadata required to support chunk images is far simpler.

B) Individual files in a file system are identified by an alphanumeric name within the context of zero or more hierarchical directories relative to a mount point. A chunk image is merely a fixed-size sequence of bytes with limited metadata and no other structure understood by the storage layers.

C) The hierarchical directories supported by a file system dataset can be manipulated by a variety of methods. A chunk image has no internal structure understood by the storage layer.

D) A conventional file within a file system can be modified with each write operation. The payload of a chunk image is created once, may be deleted but is never altered.

E) The logical length of a file in a file system can be changed with each write or truncate operation. The logical length of a chunk image never changes.

F) A file system dataset must support a complex set of coherency rules to support shared file access by multiple clients. A chunk image is written once and can be read any number of times by any number of clients.

A chunk image differs from a logical volume in that:

A) While both chunk images and logical volumes are identified within a flat namespace, the number of potential chunk image identifiers is far larger than the typical number of identified volumes.

B) The payload for chunk images is specified when the chunk is created. Volumes can have select blocks rewritten by write operations at any time.

Mapped Services

To provide a persistent payload, the information within the storage server is in an embodiment the metadata or version manifests are also tracked for objects within the context of one or more mapped services. Each mapped service is implemented as a file system or directory on the local file system.

Conventional file systems present collections of objects as a single service through mount points or shares. Each mount point is the root of a set of hierarchical directories. Clients merge a mount point into their own name space. Conventional cloud storage systems define collection of objects as a single service through containers or buckets, which may be defined in the context of an account.

The file-oriented mount point and the cloud-oriented container are both examples of a service mapping—an interface specific method of referring to a mapped service. Cloud-oriented storage systems vary on the semantics and name of containers. The OpenStack object storage system defines containers within the context of an account. The Amazon S3 system defines buckets which are associated with, but not contained within, accounts. But they both place objects within containers/buckets.

In an implementation, each mapped service is represented by a file system on each storage server. Alternate embodiments may use other local file systems, or make each mapped service a directory within a local file system. The mapped service directory or file system holds the objects for a specific storage service. This mapped service is then referenced by service mappings such as file system mount points and cloud accounts/containers. The object directories within a mapped service directory have names derived from the relative name of the object. The service mapping name used is the base of the full object name.

The relative object name, itself, will typically encode traditional directory names, which will be represented as hierarchical directories for the benefit of file-oriented access. Alternate embodiments may utilize a database to track object within specific mapped services.

Figure 2:
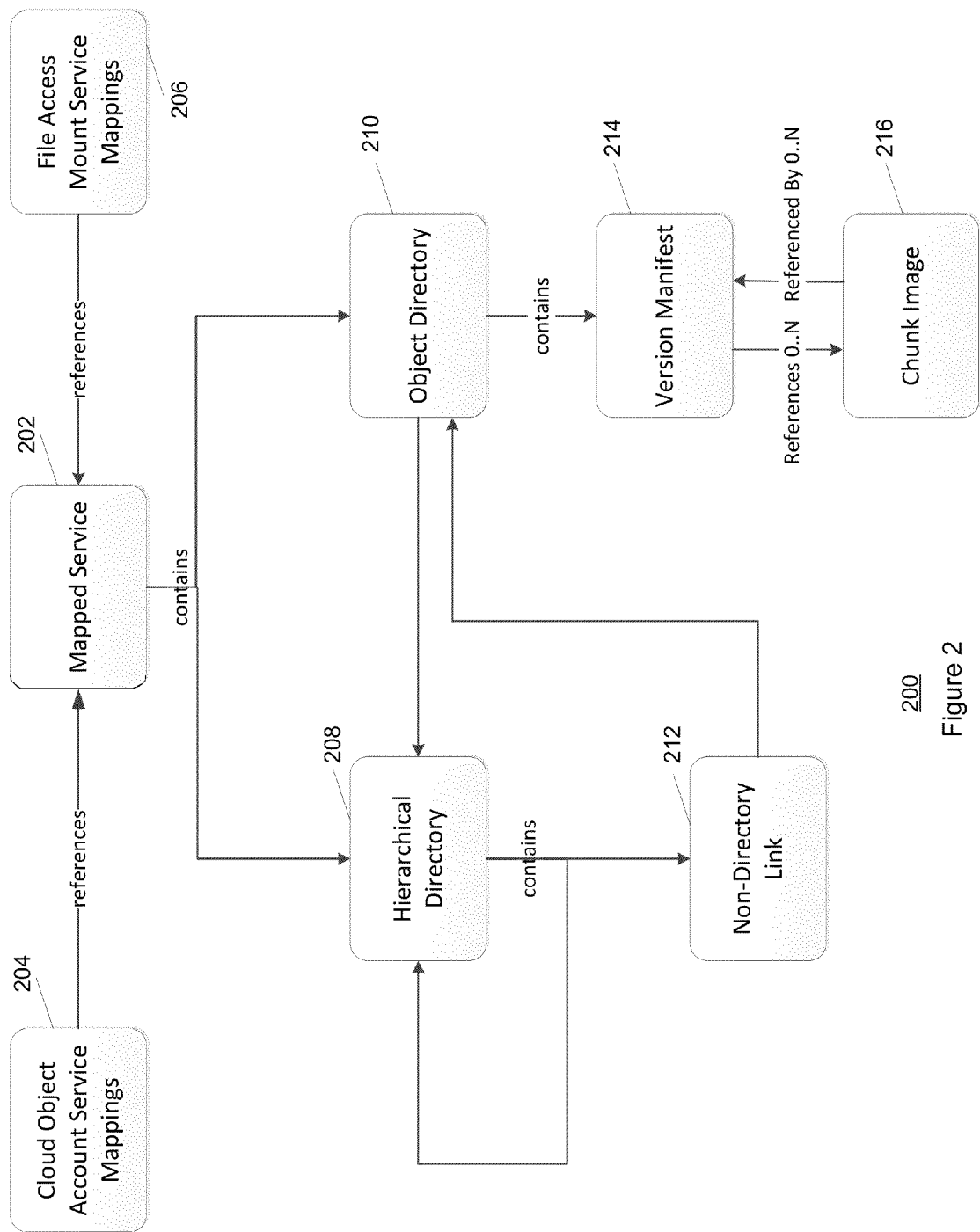
FIG. 2 illustrates a persistently stored metadata associated with a mapped service.

FIG. 2 illustrates persistently stored metadata associated with a mapped service 202. Each mapped service 202 will be referenced by one or more interface-specific mappings. This will include file access mount service mappings 206 which map file system mount points to mapped services 202 and cloud object account service mappings 204 which map cloud accounts and/or containers to mapped services 202. In an embodiment, each mapped service 202 is implemented as a directory within the local file server of each storage server.

Within the context of each mapped service 202 there will be persistent storage for zero or more object directories 210. Each of the object directories 210 is a container for the metadata for all versions of a single object. Each of the object directories 210 is uniquely named relative to the service mapping name. For example, a mapped service 202 may be accessed via a service mapping for a file-oriented mount point with the name "/usr/home/jsmith". If a file stored within that mount point has the fully qualified file name of "/usr/home/jsmith/Documents/trip_report.doc" then the relative name of the object directory would be "Documents/trip_report.doc".

In an embodiment, each object directory 210 is a sub-directory of the mapped service directory 202 with a unique name derived from the object's relative name. When the local file system will allow the names within a directory to have sufficient length, this can be a simple mapping of the relative object name which replaces the traditional directory separator. More typically, the object directory 210 will be named based upon a hash of the relative file name.

Conventional object storage systems have object directories for each object. Typically, the object directory 210 name is derived from the fully qualified object name comprised of the account, container and object names. A system and method in accordance with the present invention differs from this conventional solution in that object directories 210 are associated with mapped services 202. This prevents possible collisions of object directory 210 names from objects created for different accounts because the object directory 210 name is derived from the object name relative to the mapped service 202. The fully qualified object name differs depending on which mount point or cloud account is used to access the object, but the object directory name must be the same if it is to be shared across the different access methods.

A system and method in accordance with the present invention implements access control lists (ACLs) as metadata attributes of the mapped service. There are many well-known methods for encoding ACLs in named attributes, any of which are applicable to a system and method in accordance with the present invention.

Each object directory 210 provides the context for finding one or more version manifests 214 for the object. Each version manifest 214 is named within the context of the object directory 210 with a unique ordered version identifier. In an embodiment, each version manifest 214 is a file within the object directory 210.

The normal representation of a version manifest 214 is extended to allow for a sparse set of persistent storage blocks to be encoded without requiring that the cryptographic hash algorithm be applied to generate chunk identifiers. In one embodiment, the unique version identifier for each version manifest 214 is formed by concatenating the following fields, from most significant to least-significant. This is done in the following manner:

A) A timestamp taken from a clock synchronized across all federated storage servers.

B) A tiebreaker value that guarantees the following: in an unlikely event that two clients submit differing edits to the same object with the same timestamp, they will be logically ordered, and all storage servers referencing both transactions will agree on the order the concurrent edits logically occurred.

Methods for creating tiebreakers include concatenating a global session identifier with a sequence number and calculating a hash value of the version manifest. There are many known algorithms for generating unique session identifiers without requiring a central server. One example is to include the network address of the server within the session identifier.

C) A sequence number representing the number of prior version manifests created for this object with the same timestamp and tiebreaker.

This form of identifier allows unique version identifiers to be generated in a totally distributed fashion. An embodiment of the present invention allows any storage server to generate a new unique version identifier without requiring any form of synchronization or global locking beyond a reasonably synchronized network clock. While the ordering of updates that are initiated within the tolerance of the distributed timestamp will be arbitrary, all storage servers in the federation will agree on the order in which the transactions must be evaluated.

Different embodiments may choose alternate formats for the unique version identifier. In an embodiment, an algorithm is required that prevents two storage servers from ending up with the same unique version identifier for differing updates. This can include solutions that rely on some form of global lock manager or other forms of synchronization to serialize the creation of new version identifiers.

The algorithm provides for eventual consistency. By the time all storage servers have applied all transactions, the resulting version manifests 214 will be identical regardless of the order in which they were first applied. However, there may be a short time window where certain updates are visible to some users but not others.

When storage servers are federated they must share an algorithm which can determine the subset of storage servers that is responsible for storing the metadata for each object directory. In an embodiment, this is based on a consistent hash algorithm that selects a configurable number of storage servers from a consistent hash ring based on the hash of the concatenation of internal name of mapped service 202 and the relative name of the object.

Each version manifest 214 encodes whether the object is logically deleted as of this version. If not logically deleted, each version manifest 214 further encodes:

A) The append point for this version, which is the logical length of payload retained from the prior version manifests 214. All new chunks are appended after this offset.

B) The total logical length of the object as of this version. Alternatively, this attribute may be inferred from the logical offset and length of the highest offset chunk reference when the implementation requires an extra chunk reference for files that end with a long zero run.

C) An indication when this object represents a conventional hierarchical directory for file access explicitly required by the file-oriented access rules to exist. In some embodiments this may be implemented by encoding the version manifest 214 as a symbolic link 212 to the hierarchical directory 208.

D) Other metadata attributes expressed as a series of key/value pairs where each unique key value is assigned a value, and each key/value pair is marked to indicate when the value associated with this key was changed by the transaction that created this version manifest 214, and a null value indicates a key/value pair that was deleted by this transaction.

E) Zero or more chunk references specifying portions of the payload that are not all zeroes, wherein each chunk reference encodes the logical offset of this payload in this version of the object and the logical length of this payload.

For each chunk image 216 the storage server maintains metadata listing the set of version manifests that reference it. An embodiment supports an additional format of a chunk reference which directly encodes n bytes of payload as short inline data at a specific offset in addition to chunk references that give a chunk identifier.

Typically, an embodiment will impose a limit on the size of inline data for the purpose of minimizing the size of version manifests. As with the use of sparse non-fingerprinted blocks in a version manifest 214 in a pending state (pending manifest), this increases the importance of providing data integrity protection for the version manifest 214. Again, in an embodiment, the ZFS file system provides this data integrity protection. A pending manifest becomes a transactional manifest when the file-oriented updates are synchronized with the object to be visible to clients not using file-oriented sharing.

Manifest Lifecycle

Figure 3:
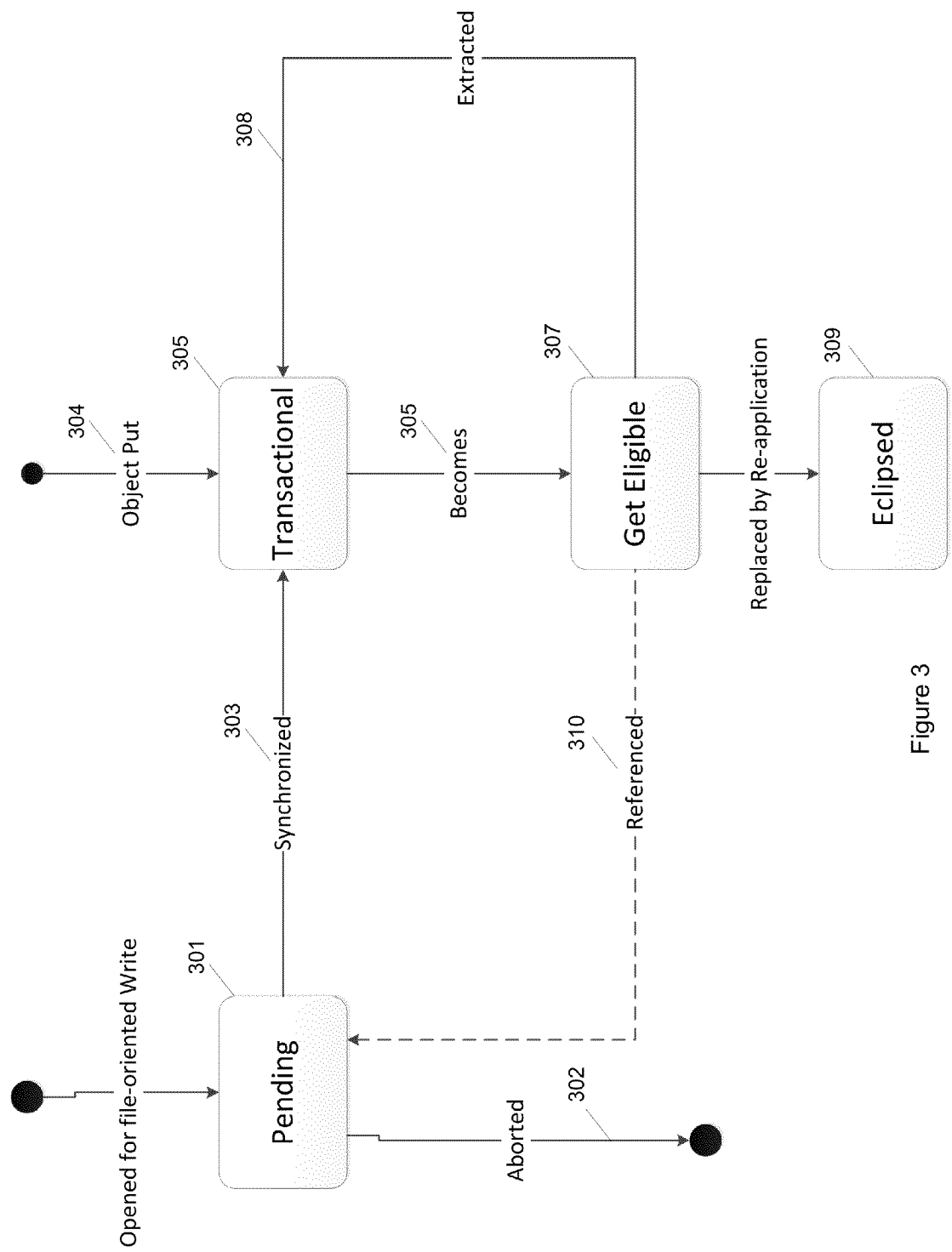
FIG. 3 illustrates a state diagram for the life cycle of a version manifest.

FIG. 3 illustrates a state diagram for the life cycle of a version manifest. First, a new version of an object is created, using either the file-oriented or object APIs. A write-enabled open or create operation using the file-oriented API creates a version manifest in the pending state, via step 301 (which is referred to as a pending manifest). When the pending manifest is created, the current gettable version of the object directory serves as the template for the new manifest.

The data and metadata of that version becomes the initial content of the new version. This is represented in the diagram with a dotted line transition 310, because it is only the content of the manifest that becomes the prior content referenced by the new pending manifest. The existing manifest does not change states.

If the shared file access epoch is aborted 302 without committing the changes, the pending manifest is discarded. A pending manifest exists for the duration of the shared file access epoch. Typically, this is the period from first open to the last close of a shared file, but shorter periods may be defined through specific user actions.

When the shared file access epoch ends the pending manifest is synchronized 303, for access by the object API. This transitions the manifest from the pending state to the transaction state 305 (which it is now referred to as a transactional manifest). This transition requires that all sparse non-fingerprinted blocks in the pending manifest be coalesced into chunk references to chunks.

In an embodiment, this coalescing of pending manifest blocks does not require copying the blocks. Rather, a chunk fingerprinting algorithm is applied to sequential blocks. When a new chunk identifier is the result a new chunk image is created. In either case, the sparse blocks in the pending manifest are replaced by the chunk reference to the new or previously existing chunk.

After all sparse blocks in the pending manifest have been converted to chunk references, an append operation or a put operation using the object API introduces a transactional manifest. Transactional manifests are transitioned to the "get eligible" state 307 (where they will be referred to simply as version manifests). This requires determining what the prior manifest was within the object directory. The metadata changes are applied to the prior manifest's metadata to produce the new metadata. If this is an append operation chunks prior to the append point are merged with those being appended. The chunk references being appended have their logical offsets adjusted by the amount of payload being retained from the prior manifest.

Whenever a transactional manifest is applied to create a new "get eligible" manifest, all existing "get eligible" manifests within the object directory which have a later unique version identifier must be regenerated. The regeneration of the manifests requires:

A) Extracting 308, the transactional manifest from each of the later "get eligible" manifests. This removes metadata key/value pairs that had been unchanged from the prior version, removes chunk references before the append point, and restores the logical offsets within the chunk references by subtracting the append point from each.

B) This newly extracted transactional manifest is then applied to the prior manifest to produce the next regeneration of the manifest. The timestamp and tiebreaker portions of the unique version identifier are unchanged, while the sequence number portion increments. The prior generation transitions to an eclipsed state 309 and the new generation becomes "get eligible".

Once a file or record encoding a manifest enters the eclipse state there is no longer a need for any user to access it. Retention for a short period to assist in diagnostic assessments of the storage server is possible, but an eclipsed manifest is no longer relevant to any client operations and will be deleted eventually.

Clients using the object API will be able to request a specific version of an object. That is done using only the timestamp and tiebreaker portions of the unique version identifier. Only the highest sequence number for a given timestamp/tiebreak combination is ever visible. The version identifier returned after a put operation includes only the timestamp and tiebreaker.

An embodiment may allow retention of sparse non-fingerprinted blocks in version manifests when the total size of the version manifest stays below a configurable threshold. This option would reduce the overhead of creating a distinctly identified chunk for short segments where the benefits of deduplication are not desired. In an embodiment, version manifests are encoded within a ZFS file system with SHA-256 checksums enabled. Using SHA-256 checksums provides equivalent data integrity protection. Embodiments using local file systems without similar data integrity protection features would have to provide their own mechanism for ensuring integrity of the version manifests.

Tracing Hierarchical Directories

Hierarchical directories were part of file system design even before UNIX made them the dominant model. They allowed large number of files to be accessed even on systems that could not expend vast amounts of high speed memory to store directory contents. While the costs of dynamic RAM have plummeted, application developers have become accustomed to organizing files in hierarchical directories. For this reason, cloud storage APIs have continued to support object queries that mimic querying the contents of a hierarchical directory. For example, almost all support finding all objects that have a name that begins with a supplied prefix.

The storage server needs to support both these prefix-based queries and the conventional hierarchical directory navigation techniques using a single set of persistent metadata. In a system and method in accordance with an embodiment hierarchical directories are created under the mapped service directory to match the conventional parsing of object names as hierarchical directories. These directories would be created either implicitly, because a cloud object's name implied that such a directory should exist, or explicitly using file operations.

An alternate strategy is to maintain a database to track containment of objects within mapped services, complete with supporting queries to find all objects within a mapped service matching a given prefix. File operations would construct the illusion of a conventional file-oriented directory to comply with the results of a given query whenever the "directory" was opened.

The object APIs supporting cloud storage daemons can create hierarchical directories to support queries derived from the relative object names of all objects known to the specific storage server. However under conventional file-oriented APIs a hierarchical directory can exist even when there are no sub-directories or files within it.

Creating an object with a relative object name matching the conventional directory name and a metadata indication that this represents a conventional hierarchical directory enables the storage server to know when file-oriented servers are expecting this conventional hierarchical directory to exist even when there are no objects that are logically contained within it.

Conceptual Timing of Updates

Cloud storage system semantics are based on the concept that each get, put, append or delete transaction takes place in a single instance. The actual process of transferring the contents of an update obviously is not instantaneous and in fact takes time. The time windows to transfer the contents of different updates can even overlap. However, each update or access is still considered to take place at exactly one instant—and at most one update occurs at any given instant.

Each get operation also takes place in an instant, no matter how long it takes to transfer the contents associated with that get operation. A get operation either takes place before or after a put/append/delete operation. If it takes place before, then the get operation will retrieve the contents of the object before the put/append/delete operation even if it completes long after the transfer for the put/append/delete operation completes. Under cloud get/put semantics, objects are sequentially accessed and updated, but never shared.

The rules for taking exclusive control of a file are as follows:

A) The periods of exclusive control have a beginning and an end. This period is defined to be a shared file access epoch. These shared file access epochs for any given object cannot overlap; a new file-oriented open of an object already in a shared file access epoch will extend that epoch rather than starting a new one. A shared file access epoch is mapped onto the conceptual timeline of cloud storage system events as the instant at the beginning of the epoch. When file access is federated with other servers using a NAS protocol then the local server must have obtained exclusive control over the file for the entire epoch.

B) A shared file access epoch begins with the first open and normally extends until the last shared file access handle for the object is closed. However, an embodiment can provide additional file operations that terminate the current epoch and begin a new one, such as a file synch request.

C) At the beginning of the shared file access epoch the existing content of the object is conceptually accessed. Any portion of the object not updated using file access will retain this prior content.

D) At the end of each shared file access epoch all updates made using the file access module can be processed as a set of chunk images that must exist and a new transaction manifest. In an embodiment, the sparse blocks in the pending manifest are snapshotted to allow them to be directly referenced as the blocks in the new persistent chunk image.

E) During each shared file access epoch the file server that has exclusive control can offer full file-sharing semantics to its clients (even its remote access clients). However, those updates will not be reflected via the object get/put API until the epoch has ended.

Many of the same rules apply to the creation and replication of version manifests and chunk images. While the methods of storing these blobs differ, the same rules about which storage server does which action apply to both. A blob is first created on any storage server. Blobs are then replicated to other storage servers, which must include the full set responsible for storing the specific blob as determined by a consistent hashing algorithm. Blobs may be deleted when space is needed from any storage server that is not responsible for storing the specific blob as determined by a consistent hashing algorithm.

Both file and object transactions will comply with the following rules to ensure coherent access to shared files/objects:

A) All chunk image put operations must complete successfully before any transactional manifest is created referencing those chunks.

B) All edits to the local file system or metadata database, including creation of version manifests, must be performed in a single atomic transaction. If the transaction does not complete, or is explicitly aborted before it is completed, the local file system or metadata database will be unchanged.

User of the object get/put API will be warned when accessing an object directory during a shared file access epoch. Whether that information is relayed to the end user or otherwise acted upon is outside the scope of the present invention.

Ordering of Instantaneous Updates

When all transactions updating an object fully replace the prior versions, the only step to reconcile each received transaction manifest is to determine whether or not this newly replicated version manifest becomes the new current version manifest file within the object directory.

However, if atomic append operations are supported under either the object or file APIs then some updates instead append content to the end of the object. Supporting eventual consistency of updates with atomic appends requires an algorithm that can eventually place the appended sequences in the correct order even if they are initially applied out of order. This is enabled by encoding of each version manifest allows the transaction manifest that created it to be recovered.

If there are already accepted version manifests for later updates, then the full set of these updates must be re-processed, and a new version manifest created using the timestamp and tiebreaker from the final applied transaction manifest and the next available sequence number. This version manifest does not need to be replicated since all other storage servers will reach the same results eventually.

Application of Transactional Manifests

Figure 4:
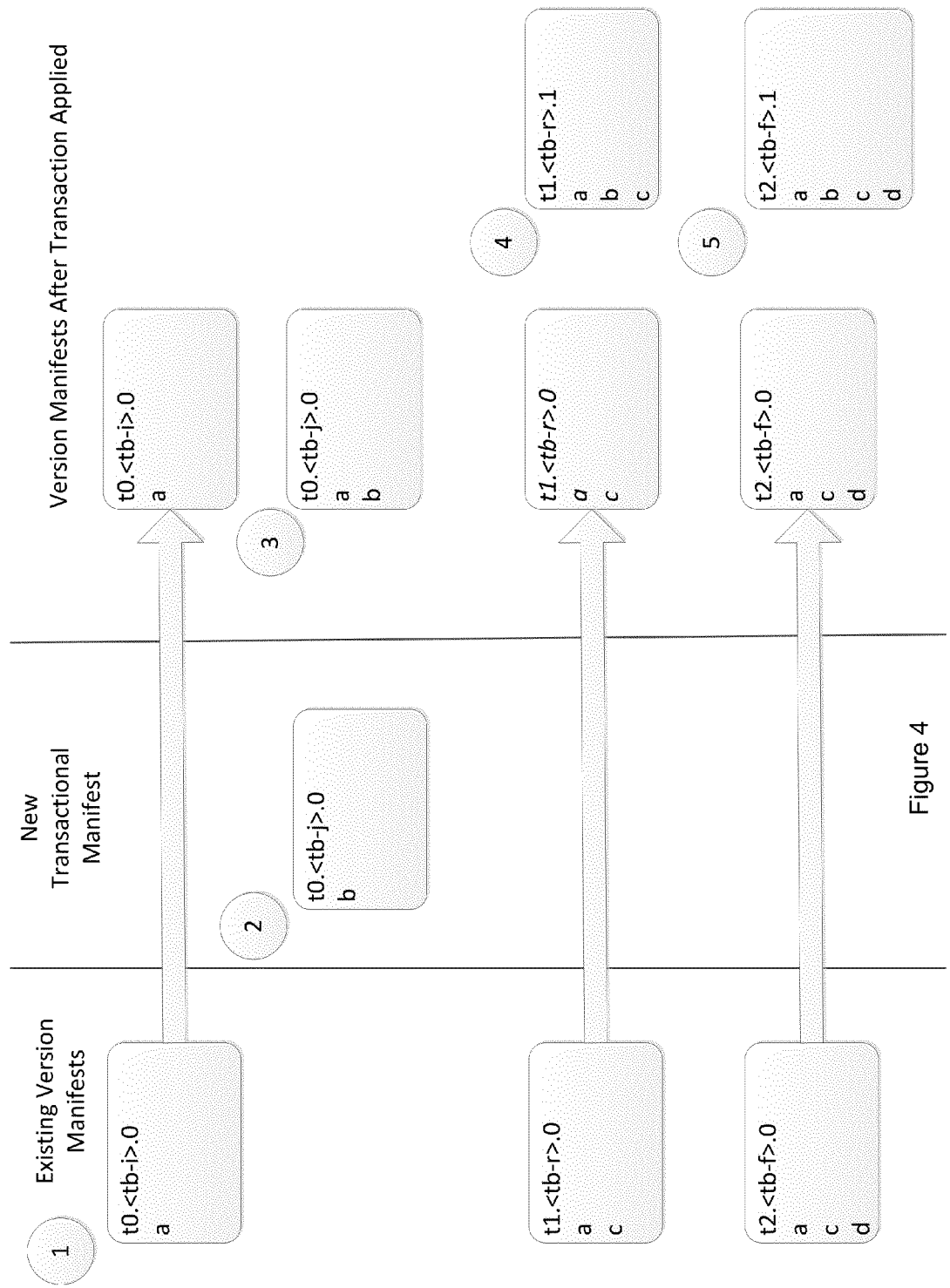
FIG. 4 illustrates the version manifests created when append operations are applied out of order on a specific storage server.

FIG. 4 illustrates the version manifests created when an object has append operations applied out of order on a specific storage server.

Step 1 represents the set of version manifests that would exist after transaction manifests had been applied for the initial put (t0.<tb-i>), and what were actually the second (t1.<tb-r>) and third (t2.<tb-f>) append operations had already been applied. In this example, the initial put place a sequence of chunk references labeled as "a" in the manifest. The second append operation added chunk references labeled as "c", and the third append operation added chunk references labeled as "d".

Step 2 represents the introduction of the transaction manifest that represents what had actually been the first append operation (t0.<tb-j>) but which has been received after the transaction manifests for the second and third append operations on this storage server. This will be interpreted as an append operation to the most recent unique version ID prior to the version id of the transaction manifest. In this example, that would be 't0.<tb-i>'. This append operation seeks to append the chunk reference sequence labeled "b" to the object.

Step 3 represents the version manifest that is created immediately after receiving the transaction manifest for the first append operation (t0.<tb-j>.0). The chunk references from the new transaction (labeled "b") are appended to the earlier version manifest chunk references (labeled "a"). This newly created version manifest does not become the current manifest for the object because the version manifests 't1.<tb-r>' and 't2.<tb-f>' have later version ids.

Step 4 represents the new version manifest created by reapplying the transaction manifest for 't1.<tb-r>' to the newly preceding 't0.<tb-j>.0'. In the example, this results in the sequence "a", "b" and "c". This is saved as the version manifest 't1.<tb-r>.1'. Note that the tiebreaker is not re-calculated even if it was originally generated as a hash of the transaction manifest.

Similarly, Step 5 represents the re-application of transaction manifest 't2.<tb-f>' to 't1.<tb-r>.1' resulting in the new version manifest 't2.<tb-f>.1' with the sequence of "a", "b", "c" and "d".

This procedure can result in very short periods of inconsistency between the federated storage servers. When this is not acceptable, a client must poll the object's version information on the full set of storage servers that are responsible for providing persistent storage for the given object. Then all missing updates are known because the serial number is monotonically increasing.

In the example provided, version manifests 't1.<tb-r>.0' and 't2.<tb-f>.0' are in the eclipsed state at the end of the transaction. There can still be ongoing operations, such as replication, that reference these files. Once these transactions are complete there is no longer any need for the storage server to retain these manifests.

Providing Version Information to Clients

The cloud API returns the unique version identifier for each object in the confirmation of a put transaction. In an embodiment, the file API makes the current version available within the metadata for each file.

Write-Enabled File Operations

A primary objective of a system and method in accordance with the present invention is to provide efficient support for both cloud and file-oriented access to the same objects. Treating each file-oriented write operation as though it were an object put would penalize file-oriented clients by requiring excessive synchronization with cloud-oriented users. Not only would these excessive synchronizations penalize file-oriented clients, the excess synchronizations would only confuse cloud-oriented clients. The cloud semantics are expecting whole updates, not partial. Deferring synchronization until a file close or an explicit synchronization request will avoid confusing cloud-oriented clients by exposing numerous interim versions of an object.

To achieve these goals, a system and method in accordance with the present invention optimizes implementation of write operations by file-oriented clients. Write-enabled file-oriented access to objects is implemented by creation of a pending manifest within the context of the object directory. The pending manifest is subject to all of the sharing rules for file access under the file oriented API.

In an embodiment, the scope of storage servers that support concurrent shared access to an object using file sharing semantics is configurable. The servers can be configured so that sharing is scoped to only cover the specific storage server on each storage server, with inter-server replication deferred to the end of the shared file access epoch. Alternately, federated storage servers can be configured to use a distributed NAS protocol such as NFSv4 to allow file-oriented sharing across multiple file servers.

In an embodiment, the pending manifest is implemented as a file in the object directory. There is never more than a single pending manifest in a given object directory. Multiple file-oriented clients must share this single pending manifest file under NAS file sharing semantics.

The pending manifest may encode:

A) A sparse set of blocks which have been updated or cached for this object version but have not yet been coalesced into chunks.

B) A set of chunk references to payload that has been modified for this pending manifest.

C) A reference to the version manifest that was the current manifest when this pending manifest was last synchronized. In the embodiment this is either a file handle for the version manifest file or a cached copy of that version manifest.

D) The set of metadata changes that are pending.

Read accesses will seek to obtain the payload from the blocks or chunk references encoded in the pending manifest, but fall back to obtaining them using the prior version manifest if not there. The required logic is a procedure for providing a file proxy to store some content locally and refers to a remote master copy for un-cached content.

Write access will create sparse blocks and/or chunk references, which will be created for chunks not previously known. Non-block aligned writes can require reading existing content so as to provide for complete blocks or chunks.

After any operation, sparse blocks can be coalesced into chunk references by putting the coalesced blocks as a chunk. If this chunk was not previously stored, the chunk image can be created referencing the snapshotted sparse blocks. If the chunk was previously stored, then the sparse blocks can be released. All sparse blocks must be converted to chunks at the end of each shared file access epoch.

Enabling write operations through the file access API to allow execution of operations at full efficiency. Forcing each block to be encoded as a full chunk would increase overhead therefore requiring fingerprinting each block and the creation of the back-references to the pending manifest. Avoiding pre-mature chunk creation also avoids creation of a large number of single-block chunks that would need to be implicitly deleted once multi-block chunks were identified.

In an embodiment, the first replica is created through RAID or mirroring features in the local file system. This allows deferral of creating networked copies after each block write; instead the cost of network replication can be deferred until a synchronization point.

Eliminating Old Version Manifests/Tracking Class of Storage

Old version manifests can be eliminated by policy and/or explicit administrative action. Similarly, the class of storage for a given version manifest can be changed by application of policy rules and/or by explicit administrative action. The class of storage for a version manifest can be encoded as a named metadata attribute or as a specific metadata value. In an embodiment, these features are combined into a single mechanism by viewing the deletion of a version manifest as being equivalent of assigning it a "deletion eligible" class of storage.

An example of a class of storage policy would be to retain the three most current version manifests for any object and to retain all version manifests for at least one hour after creation. When a version manifest is assigned a new class of storage the new class of storage must be assigned to the back reference from each of the chunk images referenced in the version manifest. The class of storage for a chunk image is the highest class of storage for any version manifest that references it.

If the resulting class of storage has changed for any chunk image then the storage server can implement changes to where and/or how the chunk image is stored. For example, a chunk image with a "priority" class of storage might have preference for storage on an SSD device, while a "normal" class of storage would be stored on a HDD. Chunks assigned to an "archival" class of storage might be stored on non-striped hard disk drives.

SSDs, in comparison to the traditional hard drives, provide a number of advantages including better random access performance (SSDs eliminate seek time), silent operation (no moving parts), and better power consumption characteristics. On the other hand, SSDs are more expensive and have limited lifetimes, in terms of maximum number of program-erase (P/E) cycles.

Deletion of a chunk image that is "deletion eligible" must be done in a manner that avoids deletion of chunk images that have been put but not yet referenced in a transactional manifest. One method for achieving this is to maintain a pending delete list. When a chunk image is noted as having no references a "delete pending" metadata entry is added noting the current time (perhaps in the form of an epoch counter). This chunk image will not be eligible for actual deletion until a minimum amount of time (or epochs) have elapsed. Any chunk query that references this chunk will delete the "delete pending" metadata entry, thereby resetting the countdown to the eventual deletion of the chunk.

Restricting File Operations

Distributed storage of metadata has implications that will typically result in embodiment specific restrictions on end user operations. Certain file operations cannot be cost-effectively supported because they would translate into far too many operations on the persistent metadata.

For example, if there are millions of object/files stored under /accountX/usr/home/jsmith then a rename of "/usr/home/jsmith" to "/usr/home/james_smith" could require editing the relative object name of millions of objects. Not only would these edits be required, but changing the objects' names will typically change the set of storage servers required to track persistent metadata for each of the objects. The work required might tie up federated storage servers for hours. This is clearly not compatible with the expectations of performing a rename operation. Therefore, deleting or renaming non-empty directories will be rejected.

Another issue is that all directory permissions created using file oriented operations must be translated into ACL regular expressions for the mapped service. Therefore because any embodiment will have limitations on the metadata capacity for any single mapped service the following restrictions may be imposed:

A) Modifying access permissions for symbolic or hard links to directories is not allowed.

B) The total size and number of ACL rules allowed for a mapped service will be implementation constrained.

Limited Access

There may be objects which are currently only to be accessed through either the file or cloud APIs, but where it is still useful to have these objects in the unified storage system. For example, the object may be made accessible via the other API at a later date. A metadata attribute of the object is used to indicate when an object is not accessible by a specific set of APIs. Having this attribute set has the following implications:

A) Attempts to reference this object via the excluded API will return an error as though the object did not exist.

B) Actions only required to support an excluded API may be deferred until the exclusion is removed. For example, creation of hierarchical directories can be deferred when the file-oriented API is excluded.

Detailed Procedures

Chunk Query

Figure 5:
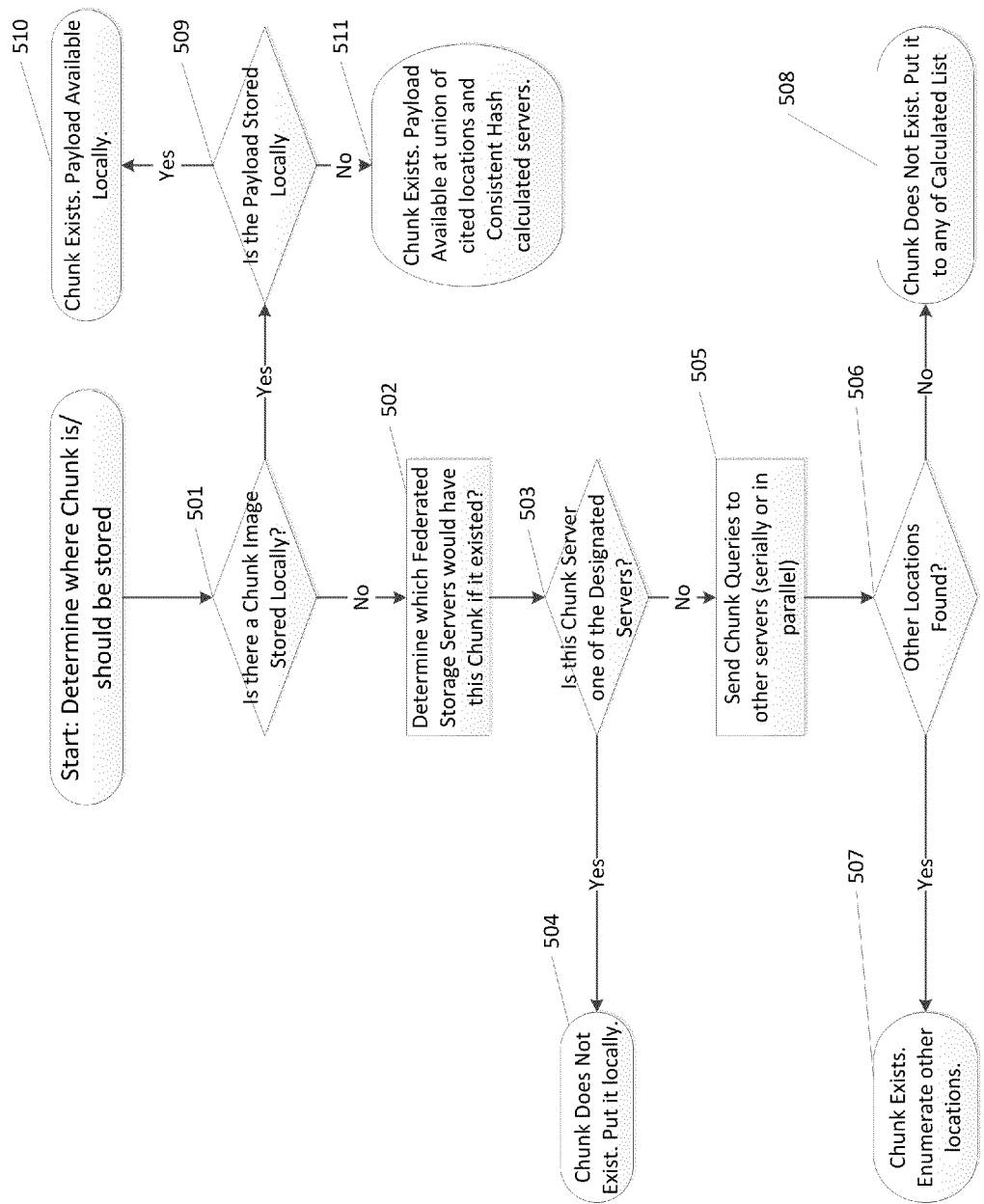
FIG. 5 illustrates an exemplary algorithm to determine the set of federated storage servers where a specific chunk is or should be stored.

For a variety of object oriented and file oriented operations, it is necessary to determine whether a given chunk already is stored in the storage server or on a federated storage server. FIG. 5 illustrates an exemplary algorithm to determine a set of federated storage servers where a specific chunk is or should be stored.

First, it is determined whether the chunk image for the requested chunk identifier is stored locally, via step 501. If it is, then determine if the payload is stored locally, via step 509. If the payload is stored locally, then the result is to report that the chunks exist locally, via step 510. If the payload is stored locally then the chunk exists and the payload is available locally, via step 510. Otherwise, via step 511 the chunk exists and is available at the union of federated storage servers cited explicitly in the local chunk image and those determined by the consistent hashing algorithm. Otherwise, if a chunk is not stored locally via step 501, determine the set of federated storage servers would have this chunk if it already exists using a consistent hashing algorithm, via step 502. A consistent hashing algorithm is achieved by mapping both the available servers and the objects to a conceptual ring. Each object is assigned to the first N server found after the spot on the ring where the object hashes. By mapping each server to multiple locations on the conceptual ring the loss of any one server results in only a portion of the objects needing to be replicated to additional servers and distributes those new assignments evenly over the remaining servers.

If this server is one of the designated storage servers, via step 503, then the fact that it does not exist here indicates that it does not exist. If it is to be created it should be put locally, via step 504. If this chunk server is not a designated chunk server, via step 503, send chunk query requests to the set of federated storage servers that should have this chunk, via step 505. This may be done serially and/or in parallel.

If other locations are found, via step 506, then the chunk exists and those located can be cited, via step 507. Otherwise, via step 508, the chunk does not exist and should be put to any of the locations calculated by the consistent hashing algorithm.

Chunk Get

Figure 6:
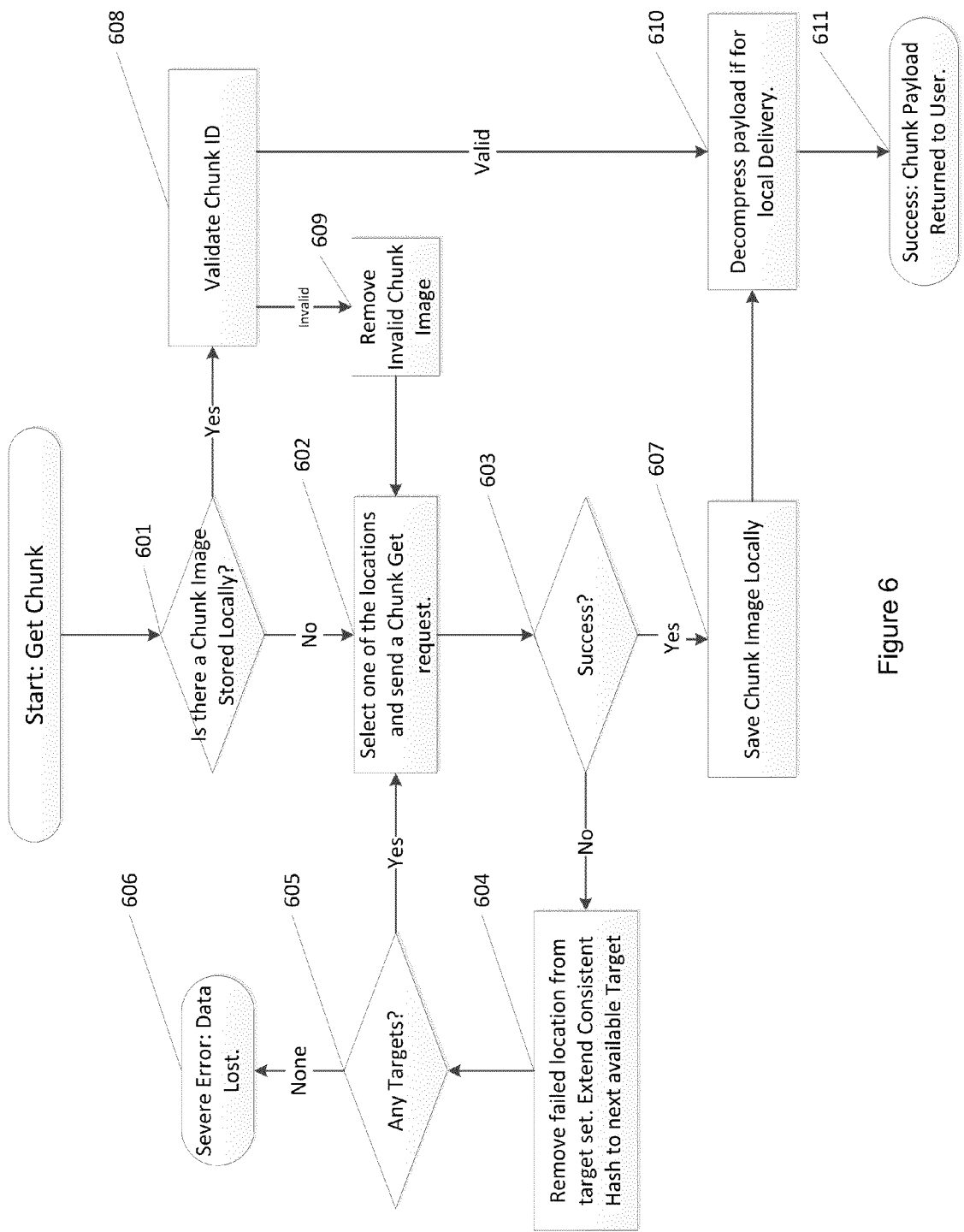
FIG. 6 illustrates an exemplary algorithm to get the payload for a chunk that is referenced in a manifest.

FIG. 6 illustrates an exemplary algorithm to get the payload for a chunk that is referenced in a manifest. First it is determined if a chunk is stored locally, via step 601. If the chunk is not stored locally 601, then 608.

Select one of the computed locations for the chunk and send a chunk get request to that federated storage server, via step 602. Next, wait for this chunk to succeed or fail, via step 603.

If there was a failure, then remove the failed location from the target set. If necessary, extend the set using the consistent hashing algorithm, via step 604. Next, determine if there are still target federated storage servers to check for this chunk, via 605. If there are none, then a severe error has occurred and a data loss must be reported, via step 606.

After a successful fetch of a chunk image, the chunk image is saved locally, via step 607. Depending on configuration and the state of the chunk server this may be the metadata only or the metadata and compressed payload of the chunk. Then decompress payload if it is for local delivery, via step 610. If the chunk image is stored locally with payload then the payload must be read and the chunk ID validated, via step 608. If the chunk payload does not match the chunk ID, via step 609, then the chunk image must be removed. Processing of the chunk then proceeds as though the chunk image had never been stored locally, at step 602. Otherwise, via step 610, the payload is decompressed (if for local delivery) and the request complete successfully, via step 611.

Chunk Put

Figure 7:
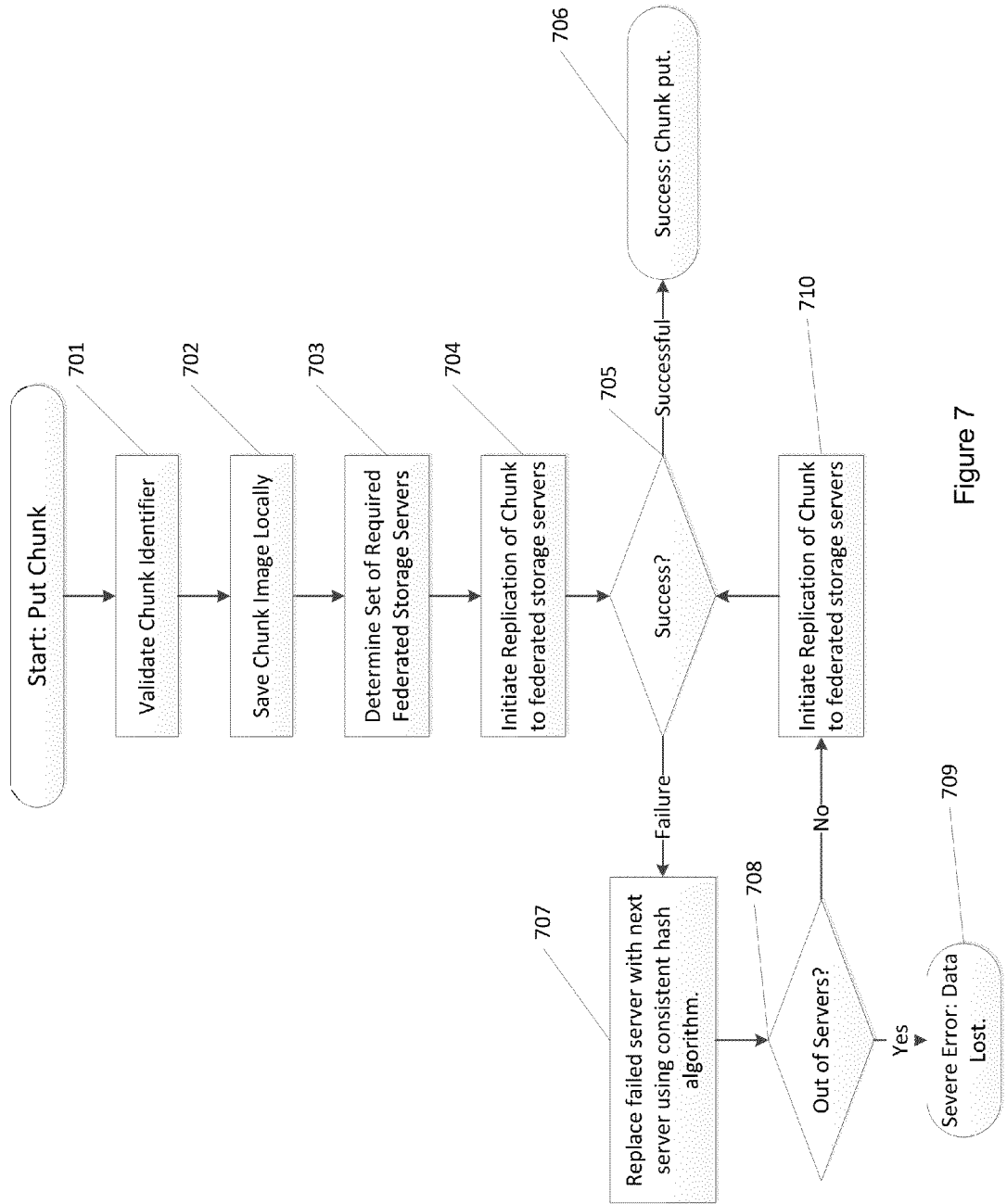
FIG. 7 illustrates an exemplary procedure to put a chunk to a specific storage server after determining that a chunk does not currently exist.

FIG. 7 illustrates an exemplary procedure to put a chunk to a specific storage server after determining that a chunk does not currently exist. The first step is to validate that the fingerprint of the compressed payload received matches the chunk identifier, via step 701. After validation is complete the chunk can be saved locally, via step 702. In an embodiment, the process of creating a chunk image will start as the payload is received and continue while the fingerprint is calculated. However, the chunk image will not be saved with the proper chunk identifier until the chunk identifier supplied is fully validated.

After saving locally the storage server will determine the set of federated storage servers that this chunk must be replicated, via step 703. In the embodiment this step may be completed earlier on a speculative basis.

Next, replication to the selected set of federated storage servers is initiated, via step 704. Certain embodiments may initiate the replication process before step 701 or step 702 are complete; however, replication cannot be complete until steps 701 through step 703 have completed. Each replication is monitored until it completes or fails, via step 705. When all required replications have completed successfully the chunk has been put, via step 706.

Otherwise, replace the failed server in the target list with the next federated storage server using the consistent hashing algorithm, via step 707. If there are no more available federated storage servers, via step 708, then return an error indication, via step 709. Otherwise, via step 710, initiate replication to the newly selected federated storage server and continue, via step 705.

Manifest Get

Figure 8:
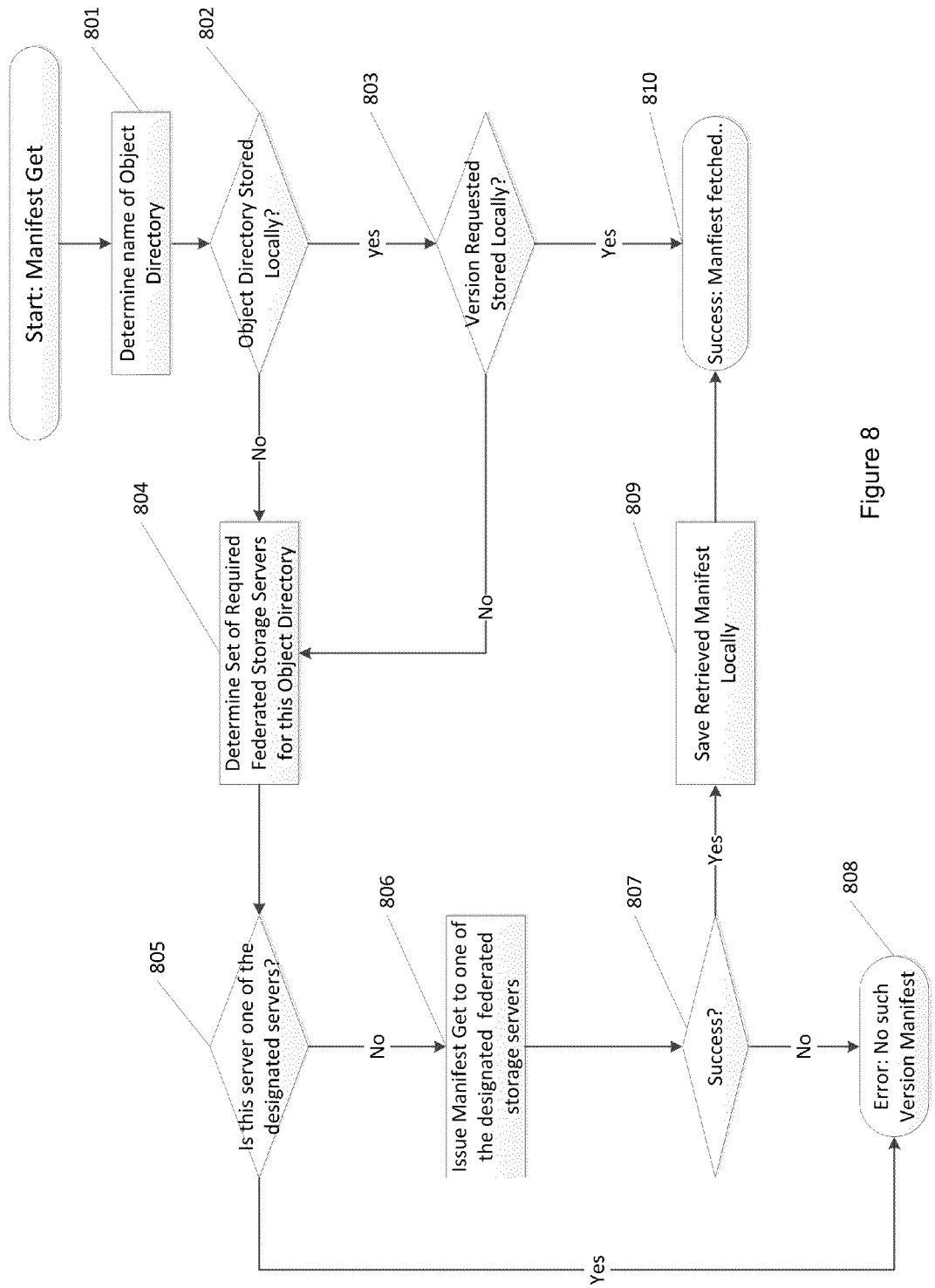
FIG. 8 illustrates an exemplary algorithm to get the manifest for an object.

FIG. 8 illustrates an exemplary algorithm to get the manifest for an object. The first step is to determine the name of the object director where version manifests would be stored, via step 801. If that object directory is stored locally, via step 802, and the requested version is stored within that directory, via step 803 then the process can continue, via step 810. Otherwise, the set of storage servers required to hold this object directory must be determined using a consistent hashing algorithm, via step 804.

If this storage server is not one of the designated servers, via step 805, then manifest get requests are issued to the designated storage servers serially and/or in parallel, via step 806. If the requested storage manifest is returned, via step 807, then the retrieved manifest is saved locally, via step 809 before proceeding, via step 810.

Otherwise, if no version manifest has been found, an error is returned indicating that the requested version does not exist, via step 808. In step 810 the requested manifest is returned to the user.

Example of Sequencing Mixed Updates to a Single Object

Figure 9:
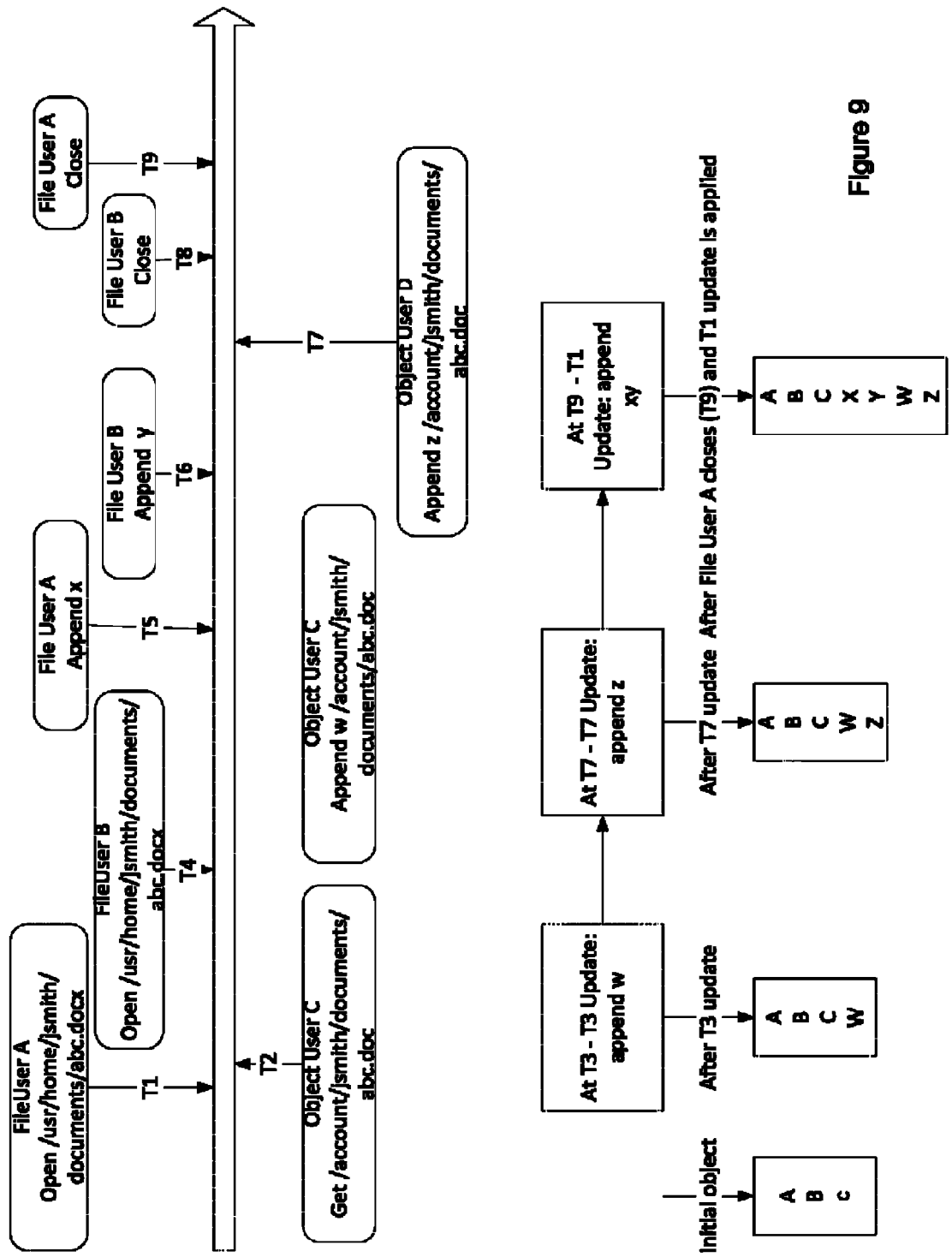
FIG. 9 illustrates an exemplary sequence of updates to a single object using both the file-oriented and object APIs.

FIG. 9 illustrates a sequence of updates performed by multiple clients, some using the file-oriented API and others using the cloud-oriented object API.

At time T1, File User A opens the object. This results in a Provisional Manifest being created with timestamp T1.

At time T2, Object User C does a get on the same object. The content returned is based on the prior manifest, which is still the current manifest for the object because the Provisional Manifest has not yet been committed.

At time T3, Object User C does an append operation (appending sequence "w" to the object). This results in a Transactional Manifest with timestamp T3.

At time T4, File User B opens the object. Because the Pending Manifest already exists this is simply a shared open of an existing file.

At time T5, File User A writes sequence "x" to the file. This modifies the Pending Manifest but does not yet produce a Transactional Manifest because no explicit call is made to sync the file.

At time T6, File User B appends sequence "y" to the file. This modifies the Pending Manifest but does not yet produce a Transactional Manifest because no explicit call is made to sync the file.

At time T7, Object User D appends sequence "z" to the object. This produces a Transactional manifest with the timestamp T7.

At time T8, File User B closes the file. Because File User A still has the file open the Pending Manifest remains a pending manifest.

At time T9, File User A closes the file. Because this user was the last user of the file the Pending Manifest can be transformed into a Transaction Manifest. In this example, this is the first time the Pending Manifest is synchronized for object API users. While this synchronization is done at T9, the Transactional Manifest has the T1 timestamp.

The above sequence of operations will result in three Transactional Manifests being applied to the object. Typically this will occur in the following order.

The Transactional Manifest with the T3 timestamp will be applied, resulting in an object with sequences "a", "b", "c" (the prior content) and "w" (what was just appended).

The Transactional Manifest with the T7 timestamp will be applied, resulting in an object with sequences "a", "b", "c", "w" and "z". Although File User A intends to overwrite the sequences "a", "b" and "c" this edit is not yet visible.

The Transactional Manifest with the T1 timestamp will then be applied, which will ultimately result in the sequence of "x", "y", "w" and "z". This is because the T1 timestamp will dictate that the "x" and "y" sequences be put replacing the original manifest (with just sequences "a", "b" and "c") but that the operations to appending "w" and "z" must be reapplied because they have a later timestamp. This is accomplished by re-application of the T3 and T7 transactional manifests.

Create-Once Strategy

Storage servers are frequently federated into a set of storage servers that provide uniform access to a set of objects. Whether using a file-oriented or object service, the user of a storage server federation is able to access objects without prior knowledge as to which subset of the storage servers are physically storing the data and metadata for any specific object.

An embodiment provides a method whereby different storage servers can each create persistent images of chunks and version manifests without fear that these persistent images will conflict with persistent images created on different storage servers. These chunk images and version manifests are "create once" objects in that they cannot be created twice with different content. If the same named object exists on two storage servers, both storage servers can assume that the other server has the same content.

First, chunks are uniquely identified by a chunk identifier which is a fingerprint of the compressed chunk payload. Different embodiments may select different fingerprinting algorithms, but the selected algorithm must provide a sufficiently wide identifier that there is effectively no possibility of either an accidental or deliberate collision where two different chunks will be assigned the same chunk Identifier. The preferred embodiment uses SHA-256 as the fingerprint algorithm. There is a strong consensus that the SHA-256 algorithm is appropriate for these purposes.

Given a fingerprint algorithm of sufficient strength, there is no need to track the status of specific persistent images of chunks on specific storage servers. Replication procedures can merely offer a specific chunk Identifier, and only transfer the chunk payload if the target indicates that it does not currently have that chunk stored. The storage servers must have an agreement whereby a minimum number of storage servers will provide persistent storage for any given chunk, but any storage server may also retain a persistent image with no adverse impact.

Second, each version manifest is created at most once with a unique version identifier. In the embodiment, the combination of a fine-grained timestamp with a tiebreaker makes it effectively impossible for the same unique version identifier to be generated multiple times for different transactions. Other well-known methods can achieve the same effective guarantee that the unique version identifier is unique.

However achieved, having unique version identifiers and content named chunks means that there is no need to track the status of specific persistent images of version manifests on specific storage servers. Replication procedures can merely offer a specific transactional manifest with a unique version identifier, and only transfer the transactional manifest when the target indicates that it does not already have the unique version identifier for this version. The storage servers must have an agreement whereby a minimum number of storage servers will provide persistent storage for the version manifests within each object directory, but any storage server may also retain additional persistent images of version manifests with no adverse impact.

In an embodiment, chunks and transactional manifests are the only entities that must be replicated between federated storage servers. Other persistent data may be stored by each of the federated storage servers, but that data can be derived from the transactional manifests or chunks.

As will be apparent to those skilled in the field, the federated storage servers must be in agreement on a number of configuration items, including the definition of service mappings, rules for chunking files, rules for selecting the compression algorithm when file-oriented access is used, methods for authenticating users, rules for assigning a class of storage to each version manifest and the procedures for a storage server to join the federation. There are many known methods for synchronizing this type of configuration data over servers within a cluster, any of which is applicable for the current invention.

Each storage server will also derive data to support later operations from the version manifests. The rules for deriving this data are the same for every storage server. Therefore every storage server in the federation will derive the same data given the same set of version manifests. In an embodiment of the present invention avoids the need to transfer this derived data between storage servers over the network.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A computer implemented method for enabling file-oriented shared concurrent read/write access to versioned objects in an object storage system, the object storage system including a plurality of storage servers; the method comprising:

expressing all updates to versioned objects as a transactional manifest submitted using an object interface; wherein each transactional manifest includes a unique version identifier which can be generated by any of the plurality of storage servers without requiring global synchronization with other storage servers; wherein the unique version identifier incorporates a timestamp of a transaction and an identifier of a source storage server; the unique version identifier references a separately stored payload solely with a chunk identifier formed as a cryptographic hash of the payload, with no reference to storage servers holding the payload; and the unique version identifier can be applied by each receiving storage server in any order to produce version manifests which will represent the same object payload and metadata on all receiving storage servers once the full set of transactional manifests created by any node during a specific time period has been applied; and maintaining a pending manifest to support file-oriented access in a same context as the version manifests for an object, wherein the pending manifest is a file which: exports a file under shared concurrent read/write access NAS semantics while implementing it as a local file which encodes: a set of blocks which have been modified using file operations since the pending manifest was created, but which have not been collected into a chunk for use by the object storage system; a set of chunk references which have been created to represent portions of the file modified using file operations since the pending manifest was created, but which have not been published in a transactional manifest modifying the object; and a reference to the version of the object to be modified, wherein this reference version is the source for all payload not otherwise defined in the pending manifest; and is translated to a transactional manifest in accordance with object storage systems create once rules to be applied to the object with a timestamp based on the creation or last synchronization of the pending manifest when the pending manifest is fully closed by all shared file access clients or is otherwise synchronized.

2. The method of claim 1, wherein data supporting queries of objects as though they were organized in conventional hierarchical directories is built on each storage server derived based on information in the transactional manifest during the same operation that creates the version manifest without requiring the query supporting data to itself be replicated.

\* \* \* \* \*